United States Patent
Hu

(10) Patent No.: US 9,864,083 B2
(45) Date of Patent: Jan. 9, 2018

(54) BEAT TONE FULL WAVEFORM INVERSION

(71) Applicant: ADVANCED GEOPHYSICAL TECHNOLOGY INC., Houston, TX (US)

(72) Inventor: Wenyi Hu, Katy, TX (US)

(73) Assignee: Advanced Geophysical Technology, Inc., Sugar Land, TX (US)

(*) Notice: Subject to any disclaimer, the term of this patent is extended or adjusted under 35 U.S.C. 154(b) by 169 days.

(21) Appl. No.: 15/004,689

(22) Filed: Jan. 22, 2016

(65) Prior Publication Data

US 2016/0216389 A1 Jul. 28, 2016

Related U.S. Application Data

(60) Provisional application No. 62/107,025, filed on Jan. 23, 2015.

(51) Int. Cl.
  *G01V 1/28* (2006.01)
  *G01V 1/30* (2006.01)
  *G01V 1/32* (2006.01)

(52) U.S. Cl.
  CPC ............ *G01V 1/282* (2013.01); *G01V 1/303* (2013.01); *G01V 1/325* (2013.01); *G01V 2210/43* (2013.01); *G01V 2210/614* (2013.01); *G01V 2210/6222* (2013.01); *G01V 2210/66* (2013.01); *G01V 2210/675* (2013.01); *G01V 2210/679* (2013.01)

(58) Field of Classification Search
  CPC ........ G01V 1/282; G01V 1/303; G01V 1/325; G01V 2210/43; G01V 2210/6222; G01V 2210/66; G01V 11/00

USPC .......................................... 367/73
See application file for complete search history.

(56) References Cited

U.S. PATENT DOCUMENTS

| | | | |
|---|---|---|---|
| 2011/0090760 A1* | 4/2011 | Rickett | G01V 1/282 367/73 |
| 2011/0131020 A1* | 6/2011 | Meng | G01V 1/303 703/2 |
| 2016/0070023 A1* | 3/2016 | Herrmann | G06F 17/13 702/14 |

OTHER PUBLICATIONS

Allemand et al, "Full Waveform Inversion guided migration velocity analysis", SEG Technical Program Expanded Abstracts 2014, SEG Denver 2014 Annual meeting, Oct. 26-31, 2014, pp. 4712-4717 (Year: 2014).*

(Continued)

*Primary Examiner* — Ian J Lobo
(74) *Attorney, Agent, or Firm* — Spradley PLLC; Michael Spradley

(57) ABSTRACT

A full wave inversion (FWI) may utilize an Amplitude-Frequency-Differentiation (AFD) or a Phase-Frequency-Differentiation (PFD) operation to form a velocity model of a subterranean formation utilizing recovered low wavenumber data. Received seismic data is processes to isolate two data signals at different frequencies. In an AFD operation, the two data signals are summed and the data of the envelope of the summed function is used for the FWI. In a PFD operation, the phase data of the quotient of the two data signals is used for the FWI. The FWI proceeds iteratively utilizing either the AFD or PFD data or with single frequency data until the cost function of the AFD or PFD is satisfied.

13 Claims, 10 Drawing Sheets

(56) References Cited

OTHER PUBLICATIONS

Pratt, G., "Seismic Waveform Inversion in the Frequency Domain, Part 1: Theory and verification in a physical scale model" Geophysics, May-Jun. 1999, pp. 888-901, vol. 64, No. 3 (Year: 1999).*
Allemand et al, "Combining Full Waveform Inversion and Tomography:Full Waveform Inversion-Guided Tomography," 77th EAGE Conference and Exhibition 2015, IFEMA Madrid, Spain, Jun. 1-4, 2015 (Year: 2015).*

* cited by examiner

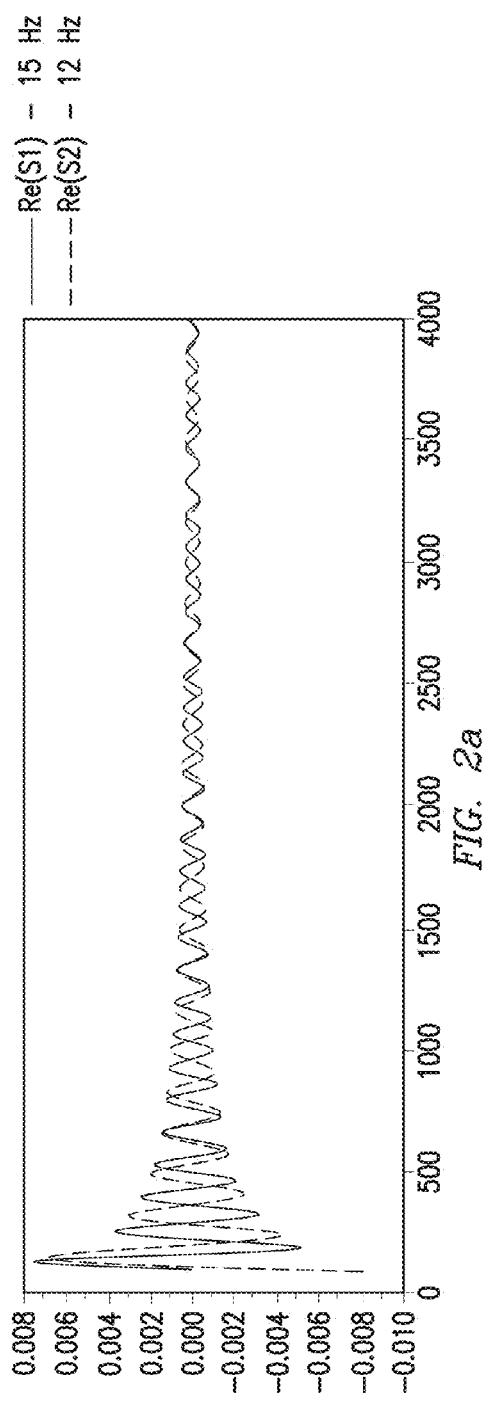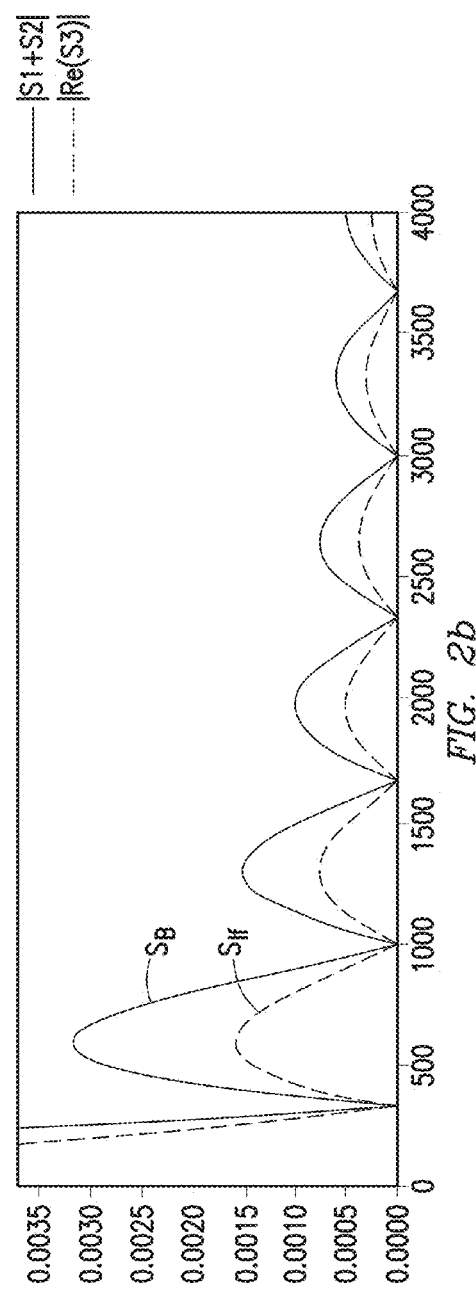

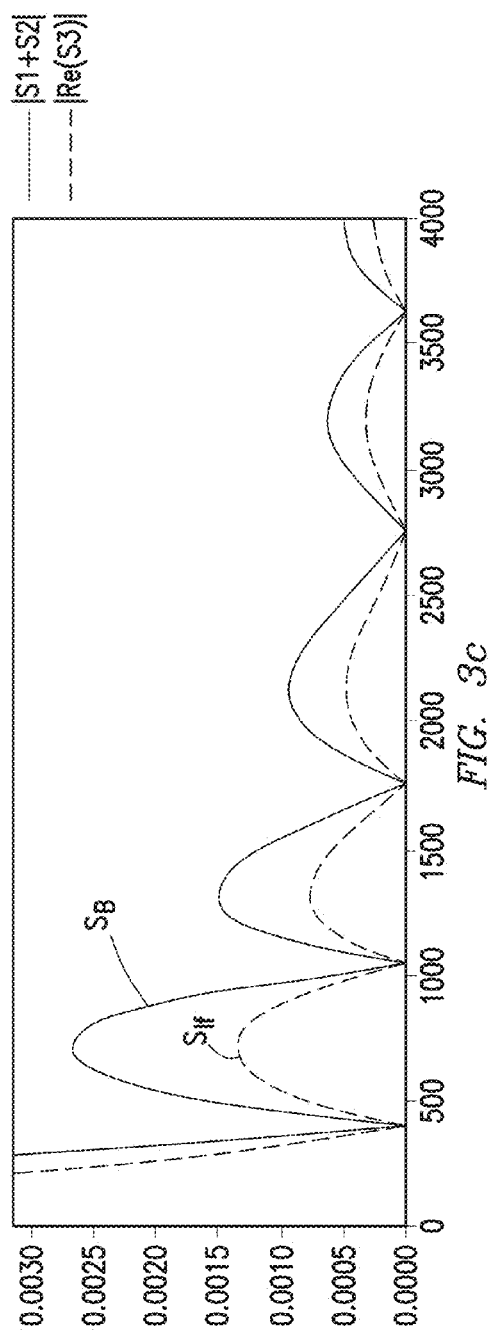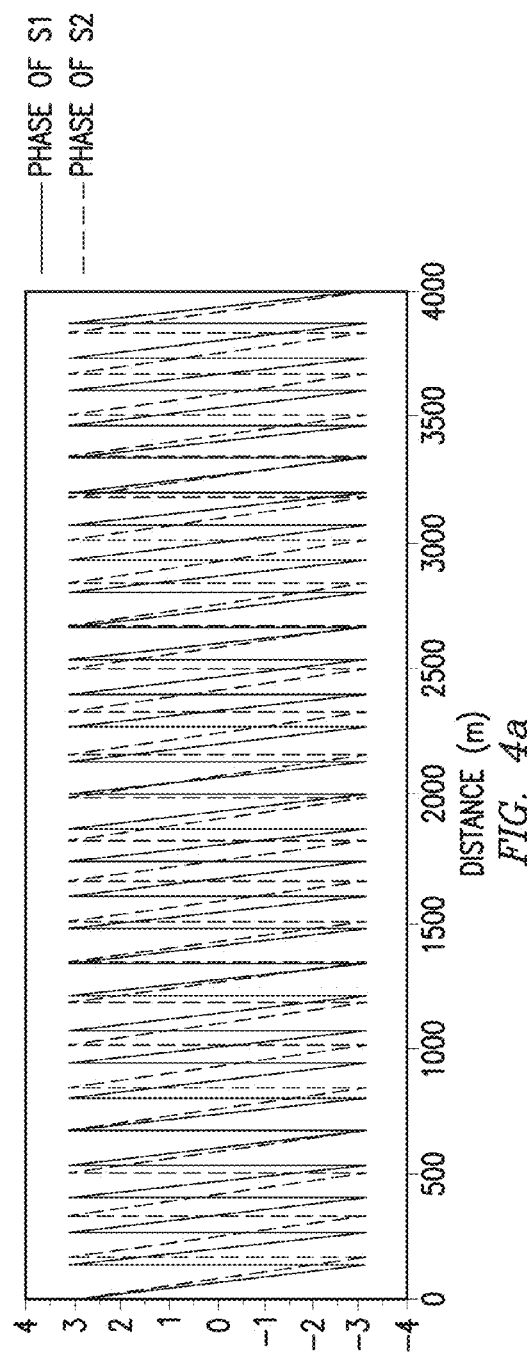

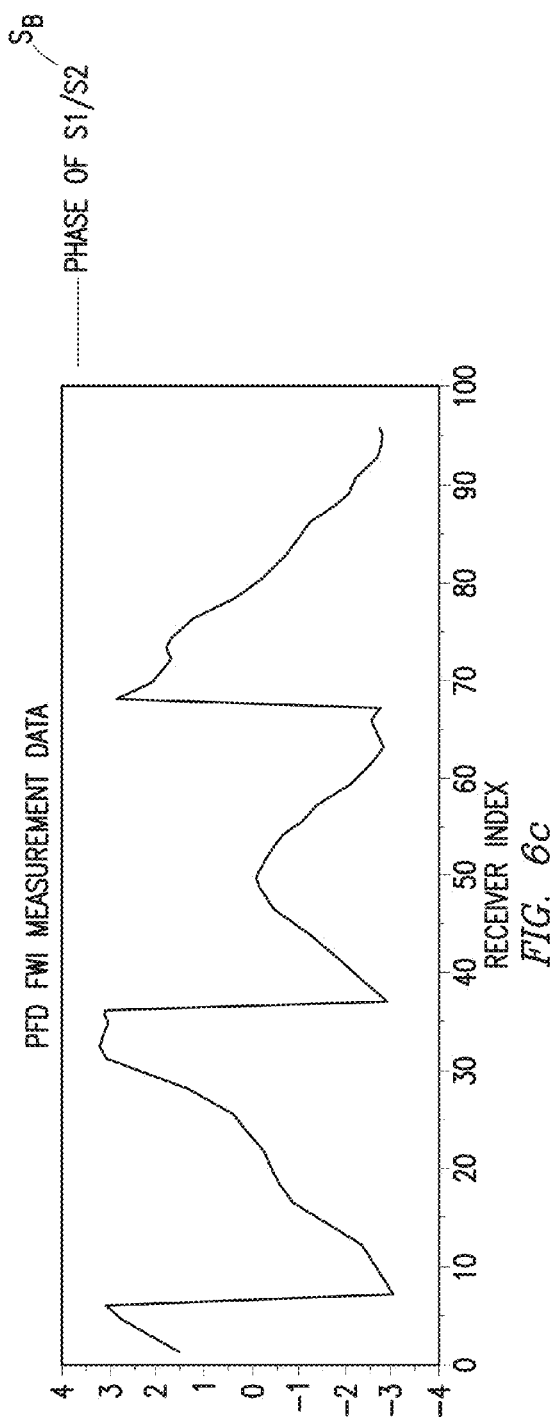
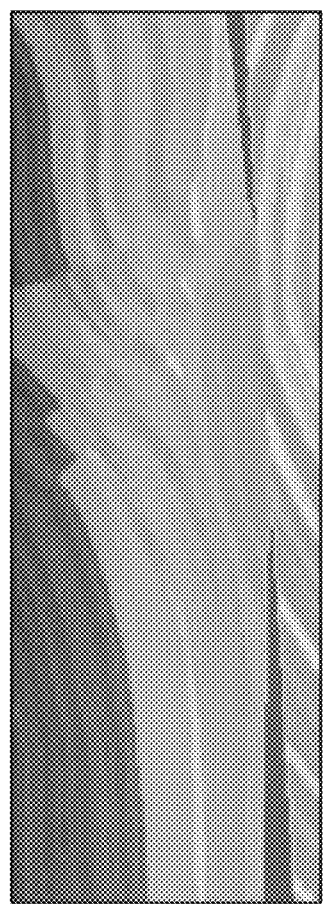

BEAT TONE FULL WAVEFORM INVERSION

CROSS-REFERENCE TO RELATED APPLICATIONS

This application is a nonprovisional application which claims priority from U.S. provisional application No. 62/107,025, filed Jan. 23, 2015, the entirety of which is hereby incorporated by reference.

TECHNICAL FIELD/FIELD OF THE DISCLOSURE

The present disclosure relates to processing of seismic data.

BACKGROUND OF THE DISCLOSURE

In order to determine the composition and structure of an underground formation, seismic data may be utilized. As understood in the art, when a seismic wave propagates through the earth from a source to a receiver, the received seismic wave may bring information about geophysical properties of the subsurface volume. The properties may include, without limitation, seismic wave velocity, mass density, and anisotropy properties. In exploration geophysics, by recording the seismic waves at the surface by one or more geophones or hydrophones, a model of the subsurface strata may be determined through various seismic processing techniques.

The time between transmission of the seismic wave and reception of the reflected seismic waves may be measured to determine the distance to an interface. More advanced techniques, such as reflection velocity tomography, are capable of using kinematic information contained in the seismic reflection data to transform the seismic data gathered from the reflected waves to determine a more detailed and complete model of the underground seismic velocity model. Another technique, known as full waveform inversion (FWI), utilizes full waveform information, i.e. both phase and amplitude data, both transmission seismic data and reflection seismic data, both primaries and multiples, contained in the seismic data gathered from the recorded seismic waves to generate a high resolution velocity model or other geophysical property model of the underground formation through optimal data fitting.

Because of hardware limitations of geophones and hydrophones, seismic data is typically band limited, rendering low frequency seismic data unavailable. Due to the lack of low frequency data, large underground structures are less able to be identified due to issues including without limitation nonlinearity of the FWI and the cycle-skipping phenomenon. Nonlinearity and cycle-skipping can result in incorrect data fitting as, for example, the inversion may be trapped in local minima, preventing the updated models from progressing properly. Nonlinearity and cycle-skipping each increase in effect and likelihood with increasing frequency during an inversion operation.

SUMMARY

The present disclosure provides for a method for generating a model of an underground formation from seismic data. The method may include measuring seismic data from one or more receivers in the time domain. The one or more receivers may be positioned to receive seismic waves generated by a source and emitted into the underground formation, the seismic waves forming the seismic data. The method may further include converting the seismic data from the time domain to the frequency domain to form frequency domain seismic data. The method may further include extracting, from the frequency domain seismic data, first measured frequency domain data from corresponding to a first signal at a first frequency. The method may further include extracting, from the frequency domain seismic data, second measured frequency domain data corresponding to a second signal at a second frequency. The second frequency is different from the first frequency. The method may further include generating, from a first velocity model, first simulated frequency domain data at the first frequency and second simulated frequency domain data at the second frequency. The method may further include calculating a gradient of a cost function utilizing the first and second measured frequency domain data and first and second simulated frequency domain data. The method may further include generating a second velocity model based at least in part on the calculated gradient, the second velocity model corresponding to at least one feature of the underground formation.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIGS. 2A, 2B depict a beat signal of an Amplitude-Frequency-Differentiation (AFD) method FWI consistent with embodiments of the present disclosure as received.

FIGS. 4A, 4B depict phase data of a beat signal of a Phase-Frequency-Differentiation (PFD) method FWI consistent with embodiments of the present disclosure as received.

DETAILED DESCRIPTION

Figure 1A:
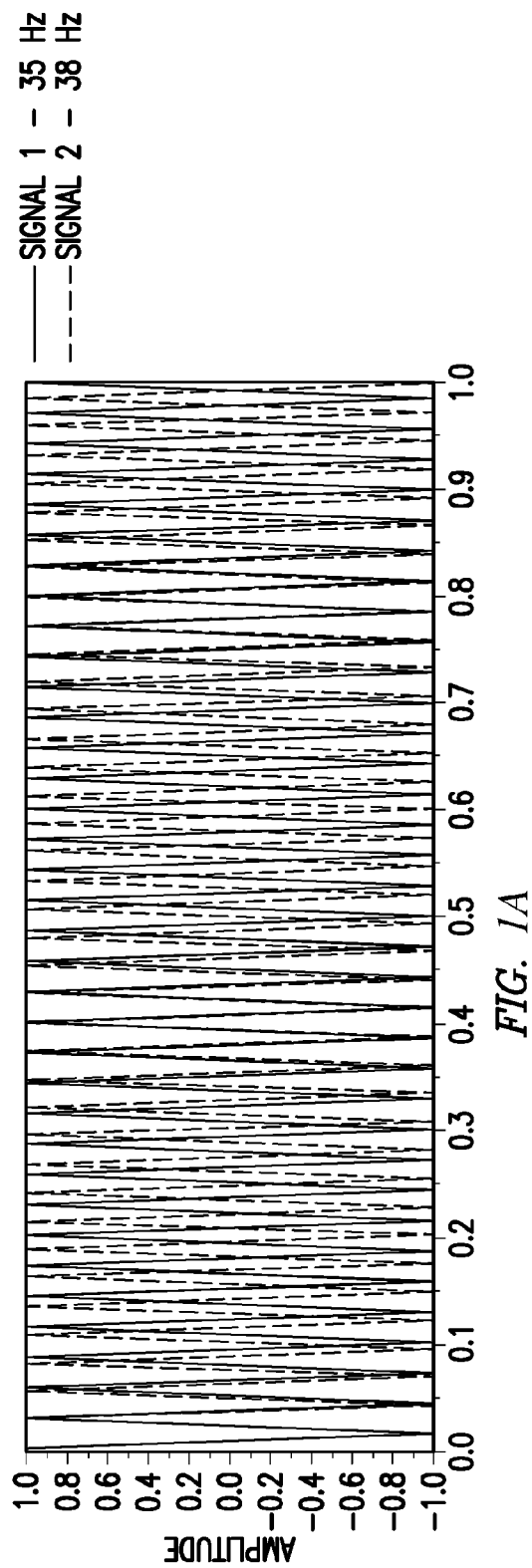
FIGS. 1A, 1B depict a beat signal of an Amplitude-Frequency-Differentiation (AFD) method FWI consistent with embodiments of the present disclosure as created by two higher frequency signals.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

In the following disclosure, it is to be understood that frequency of a signal may be expressed as either ordinary frequency, commonly measured in cycles per second or Hz, or angular frequency, measured in radians per second. As used herein, f refers to ordinary frequency and ω refers to angular frequency. One having ordinary skill in the art with the benefit of this disclosure will understand that the frequencies are related according to:

$$\omega = 2\pi f$$

and thus unless explicitly stated otherwise, the use of one or the other is not intended to be limiting.

In some embodiments of the present disclosure, a seismic geologic survey is carried out utilizing a seismic source commonly referred to as a "shot" to generate seismic waves. As understood in the art, the shot may be band limited, but include seismic waves in a range of frequencies. In some embodiments, the shot may create seismic waves from, for example and without limitation, 0.2 to 100 Hz. In analyzing the seismic waves received by the one or more geophones or hydrophones, frequency domain data may be extracted from the received time domain seismic waves corresponding to two frequencies of seismic waves using various signal processing techniques. These signals are referred to herein as $S_1$ and $S_2$. The frequencies of $S_1$ and $S_2$ are selected to be different but close to each other. In some embodiments, $S_1$ and $S_2$ may each be between 4 and 100 Hz, between 5 and 30 Hz, or between 5 and 15 Hz. In some embodiments, for example and without limitation, $S_1$ and $S_2$ may be separated by 5 Hz or less, 2 Hz or less, or 0.5 Hz or less.

As understood in the art, when two time domain single frequency acoustic waves are close in frequency, the interference between the two signals may result in an apparently single tone of temporally varying volume or amplitude. The rate of variation in volume, known as a beat frequency, is determined by the difference between the two sound frequencies. For a first signal, $S_1(t)=\cos(2\pi f_1 t)$ and a second signal $S_2(t)=\cos(2\pi f_2 t)$, where $|f_1-f_2|<<f_1$ and $f_2$, the summation of the two signals is given by:

$$S_3(t) = S_1(t) + S_2(t) = 2\cos\left(2\pi\frac{f_1+f_2}{2}t\right)\cos\left(2\pi\frac{f_2-f_1}{2}t\right)$$

The addition of $S_1(t)$ and $S_2(t)$ creates a perceived carrier signal (defined by $$S_c(t) = 2\cos\left(2\pi\frac{f_1+f_2}{2}t\right),$$

whose amplitude varies slowly with the beat frequency $$f_b = \frac{f_2-f_1}{2}$$

Figure 1B:
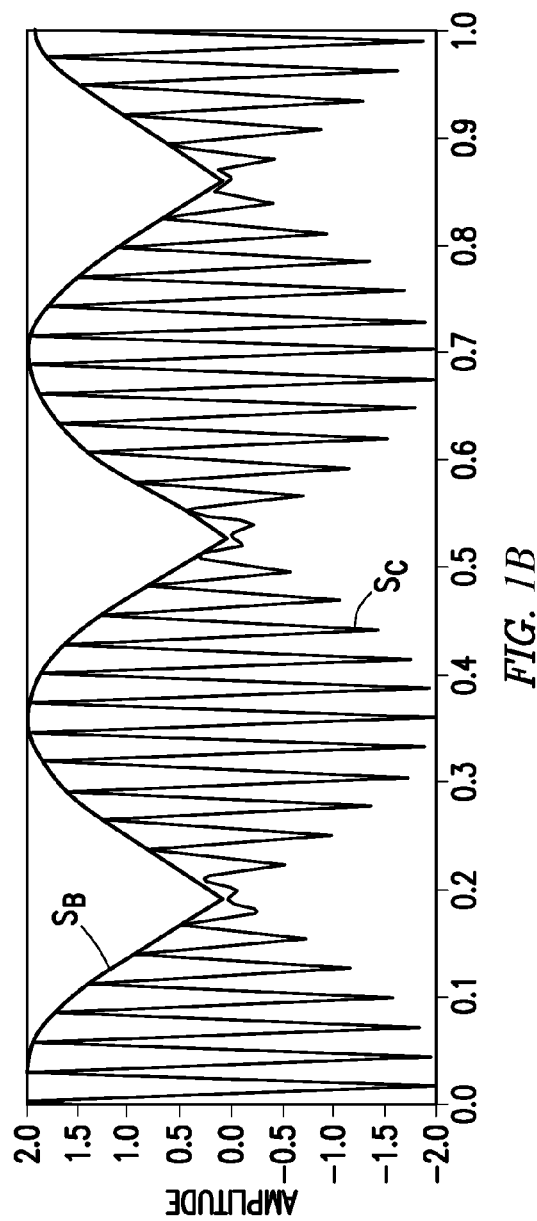

(according to the $$\cos\left(2\pi\frac{f_2-f_1}{2}t\right)$$

term). Thus, by selecting the difference in frequency between $S_1(t)$ and $S_2(t)$, the high frequency carrier signal $S_c(t)$, is modulated with the low frequency beat signal. In some embodiments, as an example and without limitation, for time domain single frequency signals, by taking the envelope of $S_3(t)$, referred to herein as beat signal $S_B(t)$, low frequency data may be extracted from the high-frequency signals $S_1(t)$ and $S_2(t)$. As depicted in FIG. 1A, signals $S_1(t)$ and $S_2(t)$ when superimposed create the amplitude variations of beat signal $S_B(t)$ as shown in FIG. 1B, and the frequency of beat signal $S_B(t)$ is determined by the difference in frequency between signals $S_1(t)$, $S_2(t)$. By selecting the frequencies of $S_1(t)$ and $S_2(t)$ close to one another, beat signal $S_B(t)$ may have a low frequency.

As understood in the art, when two frequency domain seismic waves recorded at multiple spatial locations are close in frequency, the interference between the two signals results in an apparently single tone of spatially varying amplitude. The rate of variation in amplitude is determined by the difference between the two seismic wave frequencies or wavenumbers. As understood in the art, wavenumber refers to the spatial frequency of a wave, and may be calculated according to:

$$k = \frac{\omega}{v}$$

where k is the wavenumber and v is the phase velocity of the wave. For a first signal, $S_1(x)=\exp(ik_1 x)$ and a second signal $S_2(x)=\exp(ik_2 x)$, where x is the spatial location, $|f_1-f_2|>>f_1$ and $f_2$, $$k_1 = \frac{\omega_1}{v}, k_2 = \frac{\omega_2}{v},$$

the summation of the two signals is given by:

$$S_3(x) = S_1(x) + S_2(x) = \frac{2}{|x|}\exp\left(\frac{k_1+k_2}{2}x\right)\cos\left(\frac{k_2-k_1}{2}x\right)$$

The addition of $S_1(x)$ and $S_2(x)$ creates a perceived carrier signal (defined by $$S_c(x) = \exp\left(\frac{k_1+k_2}{2}x\right),$$

whose amplitude varies slowly with the beat wavenumber $$k_b = \frac{k_2-k_1}{2}$$

(according to the $$\cos\left(\frac{k_2 - k_1}{2}x\right) \text{term}).$$

Thus, by selecting the difference in frequency between $S_1(x)$ and $S_2(x)$, the high wavenumber carrier signal $S_c(x)$ is modulated with the low wavenumber beat signal. In some embodiments, as an example and without limitation, for frequency domain signals, by taking the envelope of $S_3(x)$, referred to herein as beat signal $S_B(x)$, low wavenumber data may be extracted from the high-wavenumber signals $S_1(x)$ and $S_2(x)$. As depicted in FIG. 2A, signals $S_1(x)$ and $S_2(x)$ when superimposed create the amplitude variations of beat signal $S_B(x)$ as shown in FIG. 2B, and the wavenumber of beat signal $S_B(t)$ is determined by the difference in wavenumber or frequency between signals $S_1(x)$, $S_2(x)$. By selecting the frequencies of $S_1(x)$ and $S_2(x)$ close to one another, beat signal $S_B(x)$ may have a low wavenumber.

By utilizing the data in a low wavenumber beat signal $S_B$ for a FWI operation, otherwise unavailable low wavenumber data may be obtained.

An FWI inversion begins with an initial model, referred to herein as $\kappa_0$. After iterative inversions of seismic data, the model is gradually updated by using determined gradient information. Acoustic waves propagate according to:

$$\nabla^2 p + \omega^2 \rho \kappa p = -i\omega Q$$

where p is the pressure, Q is the injected volume acting as the source, $\rho$ is the mass density, and $\kappa$ is the compressibility of the medium. The seismic P-wave velocity, $v_p$ is determined according to:

$$v_p = 1/\sqrt{\rho\kappa}$$

The model is updated until a model $\kappa_n = \kappa_0 + \Delta\kappa$ which is close to the true model (referred to herein as $\kappa_{true}$) is determined, such that the simulated data closely fits the measured data. The gradient information is calculated from the sensitivity kernel, i.e. the response of the simulated data to the perturbation of the medium property, according to:

$$\frac{\partial p}{\partial \kappa} = -\rho\omega^2 \int_\tau p(\omega, \kappa; x, x_r) G(\omega, \kappa; x, x_s) dx$$

where $G(\omega, \kappa; x, x_s)$ is the Green's function, i.e., the solution to $$\nabla^2 p + \omega^2 \rho \kappa p = \delta(x - x_s)$$

Because $$\frac{\partial p}{\partial \kappa}$$

is a function of $\kappa$ and $\omega$, the inversion is nonlinear, and the level of nonlinearity increases with increasing frequency. Additionally, if the simulated data at $\kappa_n = \kappa_0$ and the measurement data are out of phase for more than a half period, then the gradient-based search direction will be incorrect, a phenomenon known as cycle-skipping, causing errors to propagate in subsequent models.

In some embodiments of the present disclosure, the low wavenumber information buried in beat signal $S_B$ may be extracted to carry out the FWI operation and reconstruct a model for the underground formation without suffering from cycle-skipping. Rather than inverting data from signal $S_1$ at frequency $f_1$, or data from signal $S_2$ at frequency $f_2$, or data from signal $S_3$ at frequencies $f_1$ and $f_2$ using the conventional FWI method, for example and without limitation, the inversion may be carried out utilizing the low wavenumber data extracted from beat signal $S_B$, which is constructed from high frequency seismic data at two different frequencies through mathematical operations and signal processing techniques.

In some embodiments, FWI may be carried out utilizing the amplitude data of beat signal $S_B$. In such an amplitude-frequency differentiation (AFD) inversion, beat signal $S_B$ may be defined as the envelope of $S_3$, which may then be utilized as the input data of at least one iteration of the FWI operation. As an example, FIGS. 2A and 2B depict simulated data received by 313 receivers located evenly from 100 m to 4000 m from a signal source at 0 m with constant seismic velocity v. FIG. 2A depicts real parts of frequency domain data $S_1$ and $S_2$ overlaid as received by the receivers. FIG. 2B depicts $S_B$, calculated by computing the absolute value of the amplitude or the envelope of the summation of frequency domain data from signals $S_1$ at $f_1$ and $S_2$ at $f_2$. FIG. 2B also depicts $S_{LF}$. $S_{LF}$, shown only for comparison purposes, corresponds to a true low frequency signal captured at the frequency $$\frac{f_1 - f_2}{2}.$$

In this nonlimiting example, $S_1$ and $S_2$ are 15 and 12 Hz respectively, with $S_{LF}$ thus being 1.5 Hz. As can be seen, although $S_B$ is constructed from high frequency seismic data, it includes all the same low wavenumber information as the true low frequency $S_{LF}$, also shown by:

$$S_1 + S_2 = \frac{2}{|x|} \cos\left(\frac{k_1 - k_2}{2}x\right) \exp\left(-i\frac{k_1 + k_2}{2}x\right)$$

and thus:

$$|S_1 + S_2| = 2 \left| \cos\left(\frac{k_1 - k_2}{2}x\right)/x \right|$$

By inverting $|S_1 + S_2|$ instead of $S_1$ or $S_2$ alone, for example and without limitation, during FWI processes, low wavenumber information contained in beat signal may contribute to the recovery of large scale structures while mitigating issues with cycle-skipping and local minima without using true low frequency seismic data. Because $S_B$ includes all the same low wavenumber information as the true low frequency $S_{LF}$, the FWI result obtained by inverting data from beat signal $S_B$ is expected to be identical or close to that obtained by inverting data $S_{LF}$.

Figure 3A:
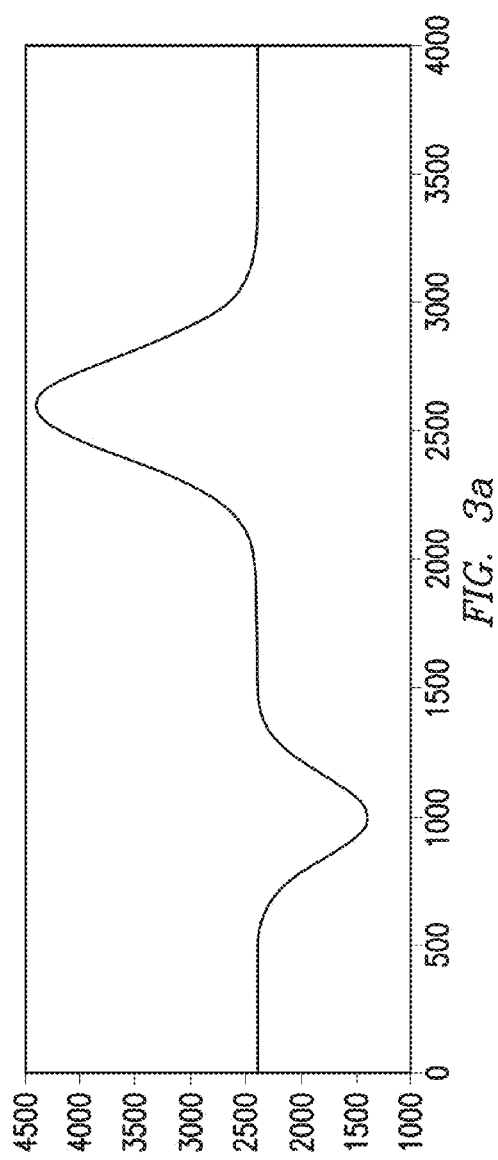
FIGS. 3B, 3C depict a beat signal of an Amplitude-Frequency-Differentiation (AFD) method FWI consistent with embodiments of the present disclosure as received showing velocity anomalies as depicted in FIG. 3A.
Figure 3B:
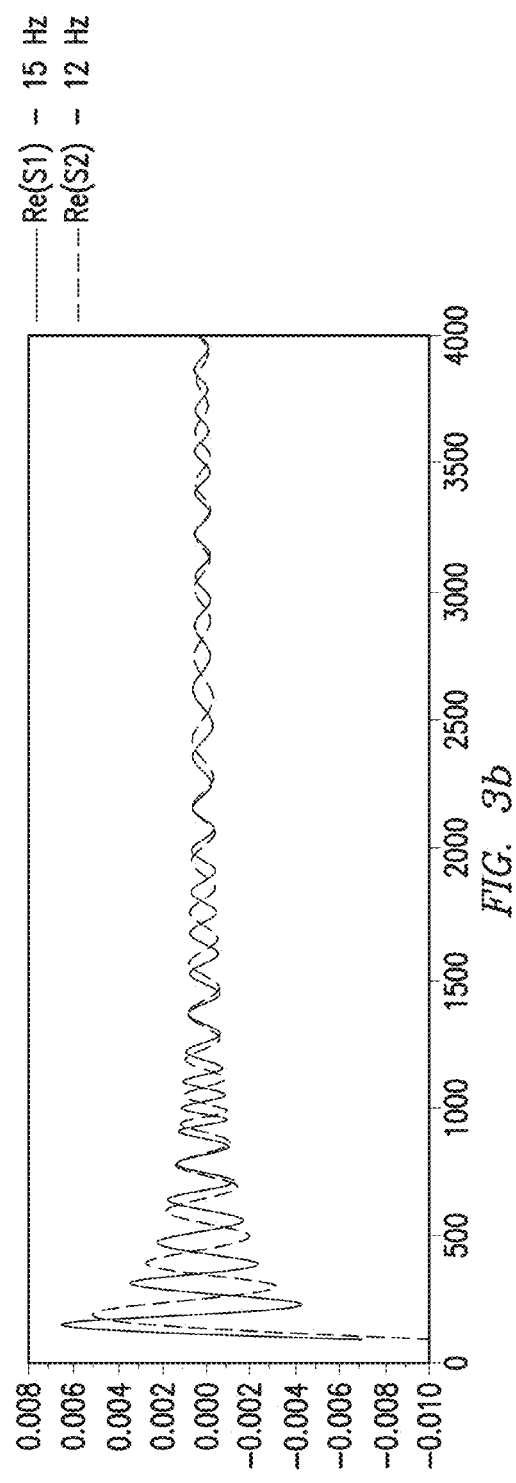

As an example, FIG. 3A depicts velocity anomalies as ideally detectable by the receivers. FIG. 3B depicts real parts of frequency domain data from signals $S_1$ and $S_2$ as computed. FIG. 3C depicts beat signal $S_B$ (the envelope of $S_1 + S_2$) and real part of true low frequency data $S_{LF}$, showing the effect of the anomalies on $S_B$.

In order to carry out FWI utilizing the AFD data, beat signal $S_B$ may be used to determine an initial model after which single-frequency FWI (for example using only $S_1$, $S_2$, or another seismic signal at another frequency) may be utilized to generate subsequent, updated models. In other embodiments, beat signal $S_B$ may be used to determine the initial model $\kappa_0$ as well as each subsequent model $\kappa_n$. In some embodiments, for each iteration of the FWI, beat signal $S_B$ may be generated by $S_1$ and $S_2$ at constant frequencies. In other embodiments, for each iteration of the FWI, beat signal $S_B$ may be generated by $S_1$ and $S_2$ at different frequencies selected to generate a different beat signal $S_B$. In some embodiments, for each iteration, beat signal $S_B$ may be generated by a variation in one or both of $S_1$ and $S_2$.

At each iteration, the quality of the fit may be calculated according to the cost function for AFD, given by:

$$C(m_n) = \frac{1}{2} \| |S(\omega_1) + S(\omega_2)|^2 - |M(\omega_1) + M(\omega_2)|^2 \|^2 + \lambda_n R_n(m_n)$$

where S is the simulated data from the model, M is the measurement data, m is the unknown vector, a function of seismic velocity model v or compressibility model $\kappa$, to be inverted, $\lambda$ is the regularization parameter, R is the regularization term, w is the angular frequency, and n denotes the iteration index. By minimizing $C(m_n)$ or iterating until it is within an acceptable error tolerance, the fit of the generated model may be improved. As understood by one having ordinary skill in the art with the benefit of this disclosure, as the simulated data becomes closer to the measurement data, the value of the cost function decreases.

In some embodiments, FWI may be carried out utilizing phase data of $S_1/S_2$ to render low wavenumber information to inversion processes. In such a phase-frequency differentiation (PFD) inversion, beat signal data is defined as $\Phi(S_1/S_2)$, i.e., phase of $S_1/S_2$, rather than envelope of $S_1+S_2$ as in AFD. In some embodiments, dividing $S_1$ by $S_2$ may, for example and without limitation, reduce the effects of source estimation uncertainty, measurement error, or unnecessary cross talk between reflection energy.

Utilizing the phase-frequency-differentiation data (i.e., beat signal data in PFD method) may mitigate or eliminate errors caused by, for example and without limitation, sensitivity to amplitude measurement error, unknown attenuation parameters Q, and uncertainty of mass density.

Figure 4B:
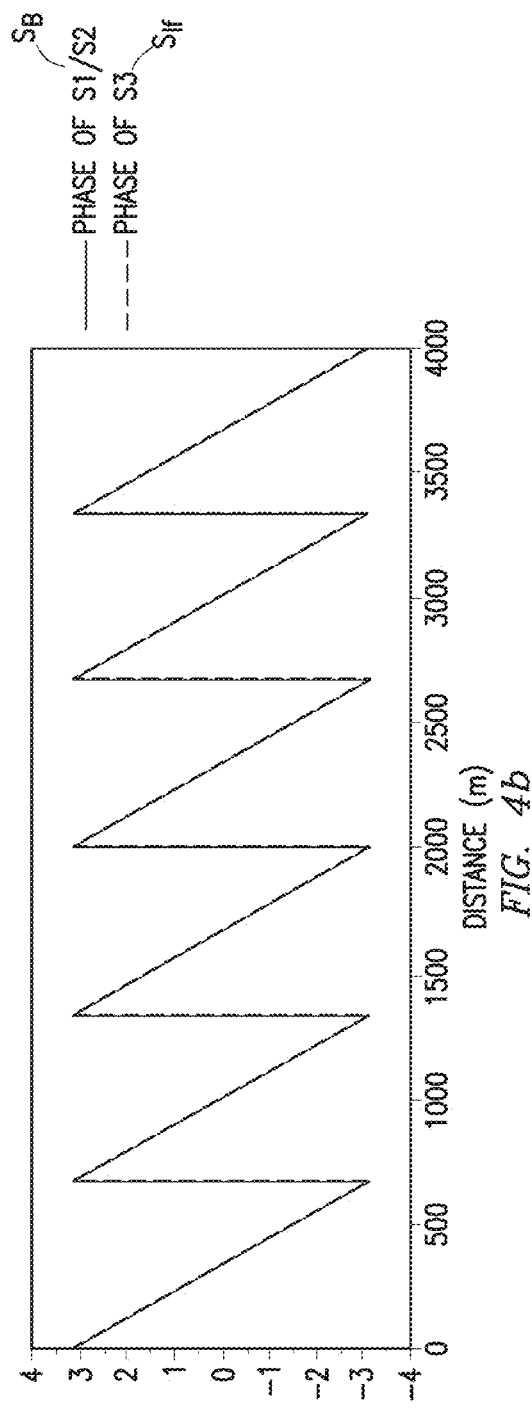

As an example, FIGS. 4A and 4B depict simulated data received by 313 receivers located evenly from 100 m to 4000 m from a signal source at 0 m with constant seismic velocity v. FIG. 4A depicts the phases of frequency domain data from signals $S_1$ at frequency $f_1$ and $S_2$ at frequency $f_2$ overlaid as received by the receivers. FIG. 4B depicts the phase of $S_B$ (i.e., $\Phi(S_1/S_2)$). FIG. 4B also depicts the phase of $S_{LF}$. The phase of $S_{LF}$, shown only for comparison purposes, corresponds to a true low frequency signal captured at the frequency of $f_1-f_2$. As can be seen, the phase of $S1/S_2$ and $S_{LF}$ are identical.

Figure 5A:
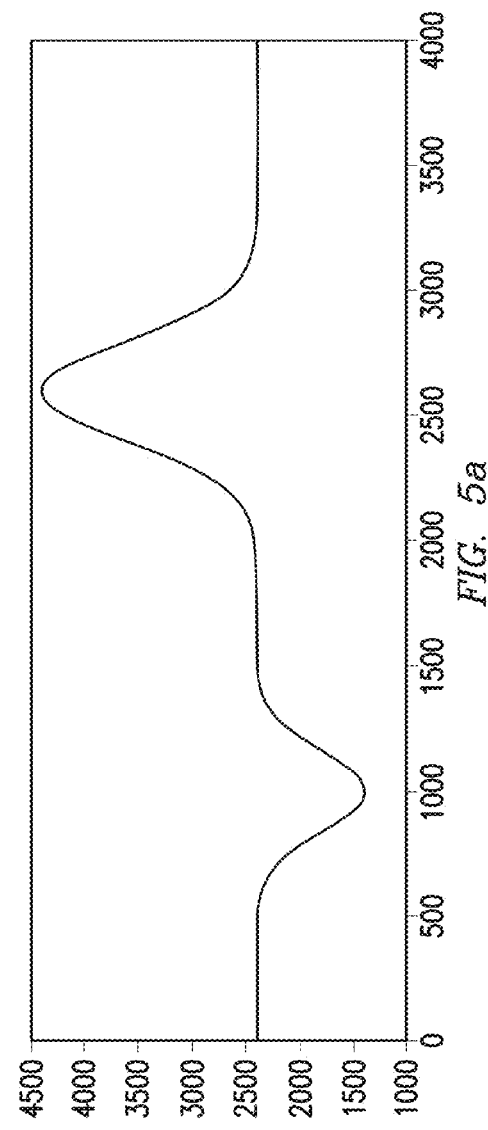
FIGS. 5B, 5C depict phase data of a beat signal of a Phase-Frequency-Differentiation (PFD) method FWI consistent with embodiments of the present disclosure as received showing velocity anomalies as depicted in FIG. 5A.
Figure 5B:
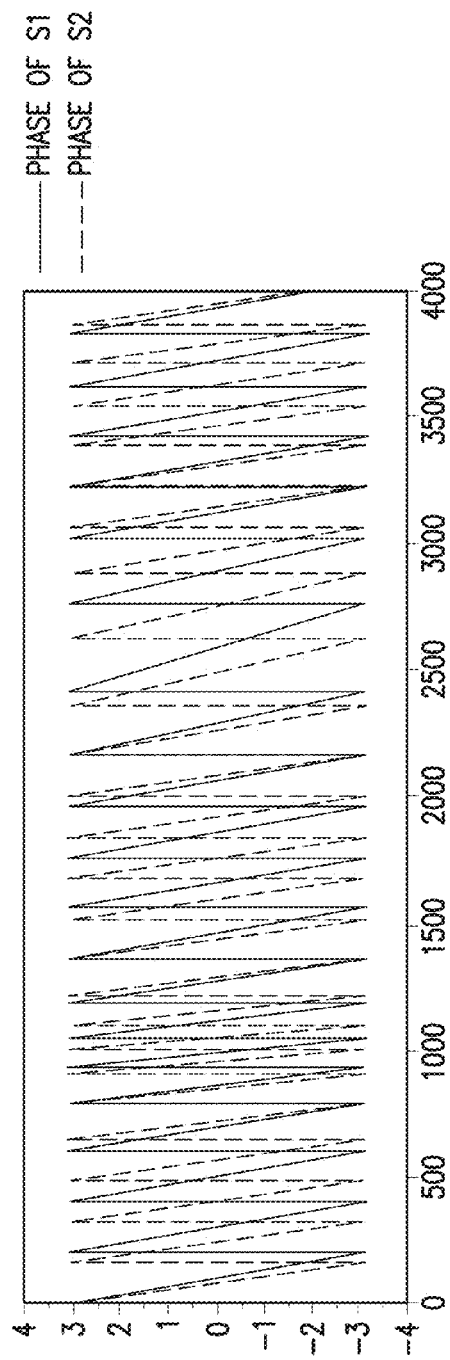
Figure 5C:
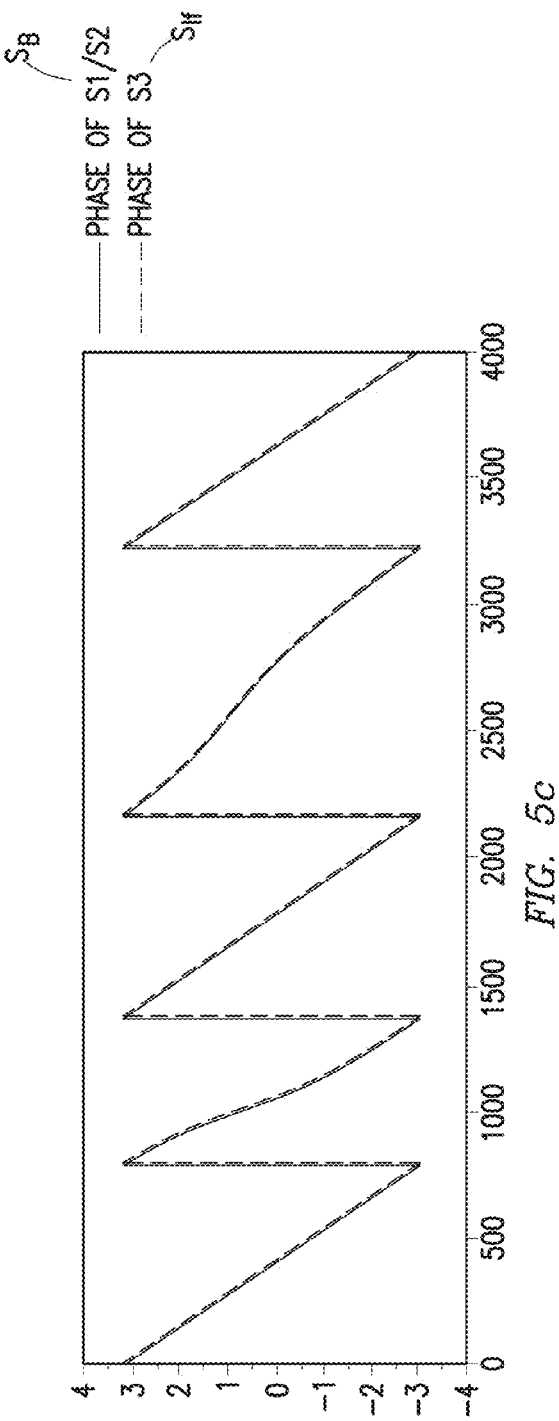

As an example, FIG. 5A depicts velocity anomalies as ideally detectable by the receivers. FIG. 5B depicts the phases of $S_1$ and $S_2$ as received. FIG. 5C depicts $S_B$ (i.e., $\Phi(S_1/S_2)$) and the phase of $S_{LF}$, showing the effect of the anomalies on the phase of $S_B$. Because $S_B$ and the phase of data $S_{LF}$ are identical, the FWI result obtained by inverting data $S_B$ is expected to be identical or close to that obtained by inverting the data $S_{LF}$.

In order to carry out FWI utilizing the PFD data, the beat signal $S_B$ may be used to determine an initial model after which single-frequency FWI (for example using only $S_1$, $S_2$, or another seismic signal at another frequency) may be utilized to generate subsequent, updated models. In other embodiments, beat signal $S_B$ may be used to determine the initial model KO as well as each subsequent model $\kappa_n$. In some embodiments, for each iteration of the FWI, beat signal $S_B$ may be generated by $S_1$ and $S_2$ at constant frequencies. In other embodiments, for each iteration of the FWI, beat signal $S_B$ may be generated by $S_1$ and $S_2$ at different frequencies selected to generate a different beat signal $S_B$. In some embodiments, for each iteration, beat signal $S_B$ may be generated by a variation in one or both of $S_1$ and $S_2$.

At each iteration, the quality of the fit may be calculated according to the cost function for PFD, given by:

$$C(m_n) = \frac{1}{2} \| \Phi[S(\omega_2)/S(\omega_1)] - \Phi[M(\omega_2)/M(\omega_1)] \|^2 + \lambda_n R_n(m_n)$$

where S is the simulated data from the model, M is the measurement data, m is the unknown vector to be inverted, $\lambda$ is the regularization parameter, R is the regularization term, $\omega$ is the angular frequency, $\Phi$ is the phase extraction operator, and n denotes the iteration index. By minimizing $C(m_n)$ or iterating until it is within an acceptable error tolerance, the fit of the generated model may be improved. The gradient vector of the cost function with respect to the unknown vector m, a function of seismic velocity model v or compressibility model $\kappa$, is calculated. The gradient vector alone, or combined with other information, may be utilized in the FWI inversion processes for velocity model update direction searching to minimize the cost function.

As understood by one having ordinary skill in the art with the benefit of this disclosure, as the simulated data becomes closer to the measurement data, the value of the cost function decreases.

Figure 6A:
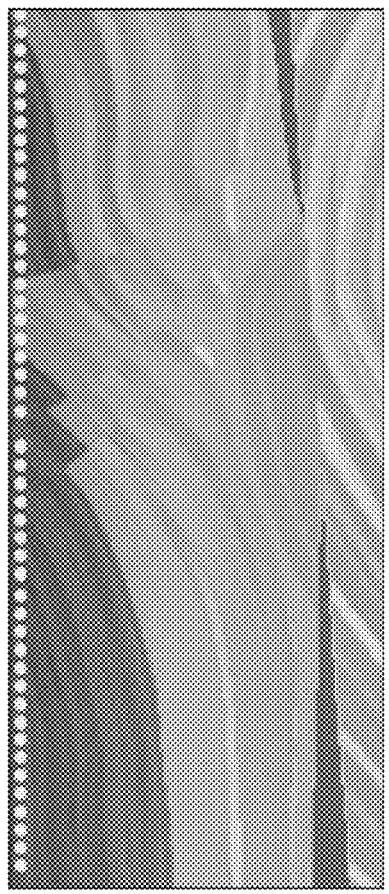
FIGS. 6B, 6C depict phase data of a beat signal of a Phase-Frequency-Differentiation (PFD) method FWI consistent with embodiments of the present disclosure as received showing velocity anomalies as depicted in FIG. 6A.
Figure 6B:
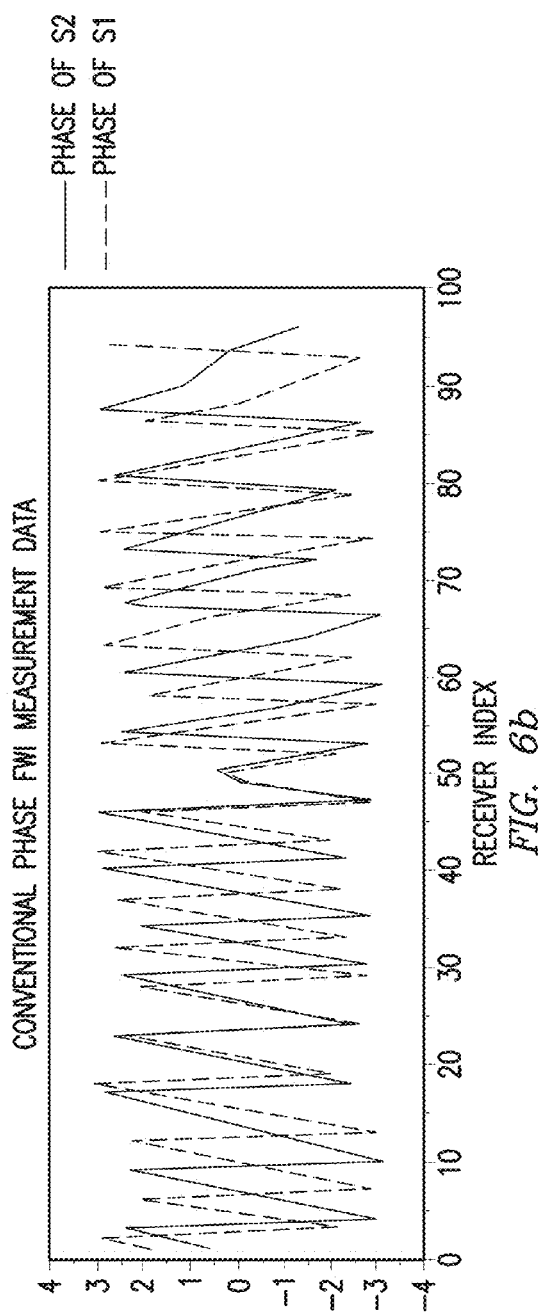

As another example of PFD measurement data (i.e., beat signal data) to be inverted, FIG. 6A depicts a test model (here, the Marmousi model) with a single source and the associated multiple receivers depicted at the top thereof. FIG. 6B depicts the phase data of $S_1$ and $S_2$ as receive by the receivers. FIG. 6C depicts the beat signal data (i.e., $\Phi(S_1/S_2)$) as a result of the PFD technique described hereinabove. As is clearly visible, the beat signal data (i.e., $\Phi(S_1/S_2)$) includes far fewer phase-wraps, thus reducing the possibility of cycle-skipping.

Figure 7B:
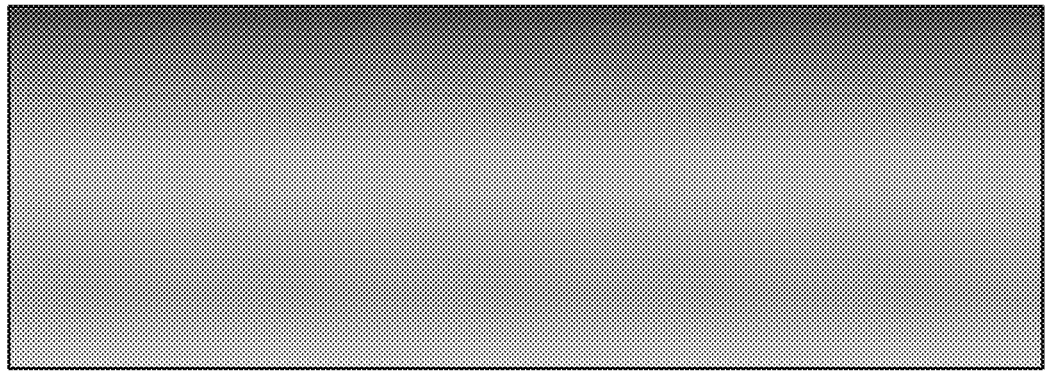
FIGS. 7C, 7D depict iterations of a model generated by a Phase-Frequency-Differentiation FWI consistent with embodiments of the present disclosure from the model depicted in FIG. 7A using an initial model as shown in FIG. 7B.
Figure 7C:
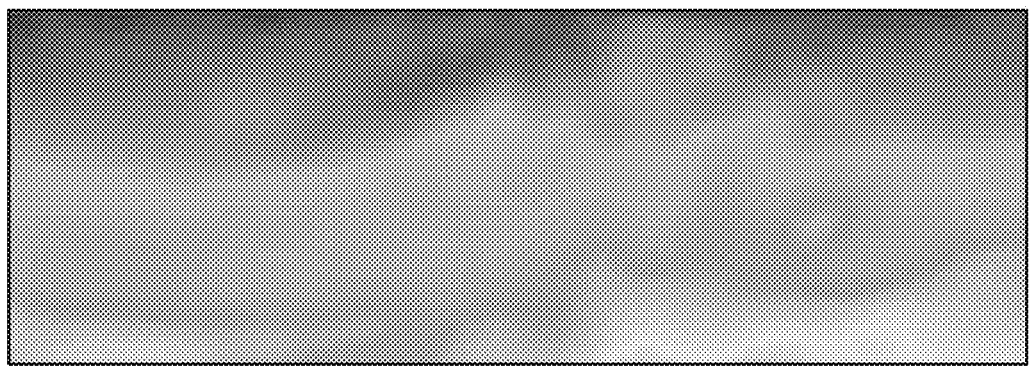
Figure 7D:
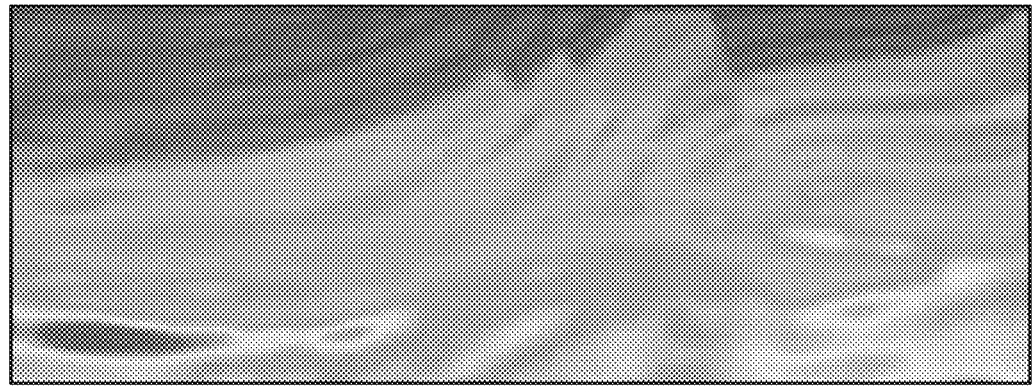

In order to further the understanding of the present disclosure, a merely exemplary and non-limiting PFD FWI operation is depicted in FIGS. 7A-7D. FIG. 7A depicts the true seismic velocity model for the exemplary PFD FWI operation, here depicted as the Marmousi model. FIG. 7B depicts the initial model used. Data is extracted from a shot such that $S_1$ is at 5 Hz and $S_2$ is at 5.5 Hz and is used with the PFD inversion as discussed above, resulting in the model shown in FIG. 7C. This model is used as the starting model for a FWI operation, which after several operations utilizing single frequency data results in the final model result depicted in FIG. 7D.

Figure 8:
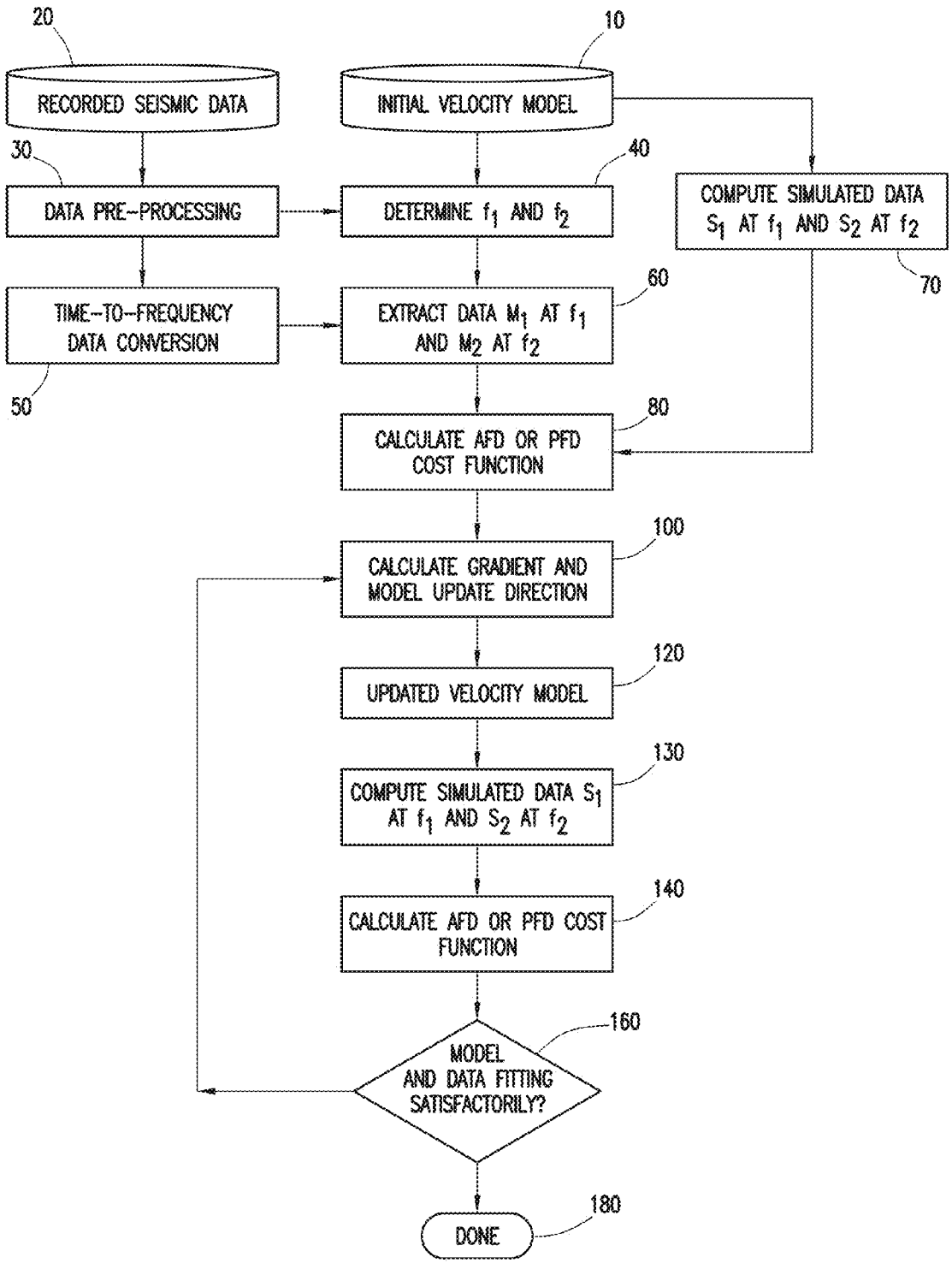
FIG. 8 is a flow chart depicting an FWI consistent with embodiments of the present disclosure.

In order to further the understanding of this disclosure, FIG. 8 depicts a flow chart of a FWI operation consistent with embodiments of the present disclosure. FIG. 8 is intended as an example and is not intended as limiting the scope of the disclosure in any way. As previously discussed, seismic data is recorded (20). In some embodiments, the seismic data may be pre-processed (30). Pre-processing may include, for example and without limitation, filtering of the recorded data.

The two frequencies $f_1$ and $f_2$ for beat signal construction may be determined (40) based on, for example and without limitation, knowledge of initial velocity model (10) and the quality and frequency range of the pre-processed data. The pre-processed time domain seismic data may be converted to frequency domain data (50) using signal processing techniques. The frequency domain data at frequency $f_1$ and $f_2$ may be extracted as $M_1$ and $M_2$ (60). The initial velocity model may be input to a seismic wave propagation engine to generate the simulated frequency domain data from signals $S_1$ with the frequency $f_1$ and $S_2$ with the frequency $f_2$ (70). The cost function and the data residual of AFD method or PFD method may then be calculated using the measurement data $M_1$ and $M_2$ and the simulated data for signals $S_1$ and $S_2$ (80) as discussed herein above. The gradient of the AFD or PFD cost function and the velocity update direction are calculated (100) to obtain an updated velocity model (120). The updated velocity model may be input into the seismic wave propagation engine to obtain a new set of simulated data $S_1$ and $S_2$ to be used for cost function and data residual evaluation (140). The updated velocity model and the data fitting are judged (160). If the data fitting is satisfactory and the update velocity model is accepted, the beat tone FWI process finishes (180). Otherwise, using the calculated gradient of the cost function, the velocity model may be updated (170) and used as the input to operations 100, 120, 130, 140, and 160. These operations may repeat until the data fitting is satisfactory, and the reconstructed velocity model is satisfactory.

In some embodiments, additional operations may be included in the above described FWI operation. For example and without limitation, in some embodiments, the initial velocity model (10) may be obtained through well logs, velocity tomography procedures, or any other velocity analysis techniques. In some embodiments, in operation 40, besides initial velocity model and pre-processed seismic data, other available information (e.g., seismic migration image, geology information) may be used to help determine $f_1$ and $f_2$.

In some embodiments, in operation 70, the seismic wave propagation engine may be based on a time domain method or a frequency domain method. In some embodiments, it may be a finite-difference method, finite-element method, integral-equation method, or other numerical methods suitable for wave propagation simulations.

In some embodiments, in operations 80 and 100, extra regularization terms may be added to further stabilize the FWI processes.

In some embodiments, in operation 120, the updated velocity model may be further modified based on a priori information such as, for example and without limitation, water bottom profile or salt body geometry.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A method for generating a model of an underground formation from seismic data comprising:
    emitting seismic waves into the underground formation by a source;
    measuring seismic data from one or more receivers in the time domain, the one or more receivers positioned to receive seismic waves from the underground formation, the seismic waves forming the seismic data;
    converting the seismic data from the time domain to the frequency domain to form frequency domain seismic data;
    extracting, from the frequency domain seismic data, first measured frequency domain data corresponding to a first signal at a first frequency;
    extracting, from the frequency domain seismic data, second measured frequency domain data corresponding to a second signal at a second frequency, the second frequency different from the first frequency;
    generating, from a first velocity model, first simulated frequency domain data at the first frequency and second simulated frequency domain data at the second frequency;
    calculating a gradient of a cost function utilizing the first and second measured frequency domain data and first and second simulated frequency domain data; and
    generating a second velocity model based at least in part on the calculated gradient, the second velocity model corresponding to at least one feature of the underground formation.

2. The method of claim 1, further comprising:
    calculating a residual of the cost function utilizing the first and second measured frequency domain data and first and second simulated frequency domain data; and if the residual is over a predetermined threshold:
    repeating the generating from a first velocity model, calculating a gradient, generating a second velocity model, and calculating a residual operations until the residual is below the predetermined threshold.

3. The method of claim 1, further comprising:
    calculating a residual of the cost function utilizing the first and second measured frequency domain data and first and second simulated frequency domain data; and if the residual is over a predetermined threshold:
    repeating the generating from a first velocity model, calculating a gradient, generating a second velocity model, and calculating a residual operations until the residual is minimized.

4. The method of claim 1, wherein the second model is generated utilizing an Amplitude-Frequency-Differentiation (AFD) operation, and the cost function is $$C(m_n) = \frac{1}{2} \| \left|S(\omega_1) + S(\omega_2)\right|^2 - |M(\omega_1) + M(\omega_2)|^2 \|^2 + \lambda_n R_n(m_n)$$

where S is the simulated data, M is the measurement data, m is an unknown vector, a function of seismic velocity model v or compressibility model κ, to be inverted, λ is a regularization parameter, R is a regularization term, ω is an angular frequency, and n is an iteration index.

5. The method of claim 4, wherein the gradient of the cost function is $$\frac{\partial p}{\partial \kappa} = -\rho \omega^2 \int_\tau p(\omega, \kappa; x, x_r) G(\omega, \kappa; x, x_s) dx$$

where p is the pressure, Q is the injected volume acting as the source, ρ is a mass density, κ is the compressibility of a medium, and G(ω, κ; x, $x_s$) is the solution to $$\nabla^2 p + \omega^2 \rho \kappa p = \delta(x-x_s).$$

6. The method of claim 1, wherein the second model is generated utilizing a Phase-Frequency-Differentiation (PFD) operation, and the cost function is $$C(m_n) = \frac{1}{2} \| \Phi[S(\omega_2)/S(\omega_1)] - \Phi[M(\omega_2)/M(\omega_1)] \|^2 + \lambda_n R_n(m_n)$$

where S is simulated data, M is the received seismic data, m is an unknown vector to be inverted, λ is a regularization parameter, R is a regularization term, ω is an angular frequency, Φ is a phase extraction operator, and n is an iteration index.

7. The method of claim 6, wherein the gradient of the cost function is $$\frac{\partial p}{\partial \kappa} = -\rho \omega^2 \int_\tau p(\omega, \kappa; x, x_r) G(\omega, \kappa; x, x_s) dx$$

where p is a pressure, Q is an injected volume acting as the source, ρ is a mass density, κ is the compressibility of a medium, and G(ω, κ; x, $x_s$) is the solution to $$\nabla^2 p + \omega^2 \rho \kappa p = \delta(x-x_s).$$

8. The method of claim 1, further comprising pre-processing the received seismic data.

9. The method of claim 1, further comprising:
determining the first and second frequencies, the first and second frequencies determined at least in part due to one or more of knowledge of the initial velocity model, the frequency range of the received seismic data, or the quality of the received seismic data.

10. The method of claim 1, wherein the first and second frequencies are between 4 and 100 Hz, between 5 and 30 Hz, or between 5 and 15 Hz.

11. The method of claim 1, wherein the first and second frequencies are separated by 5 Hz or less, 2 Hz or less, or 0.5 Hz or less.

12. The method of claim 1, wherein the first velocity model is determined through one or more of well logs or velocity tomography procedures.

13. The method of claim 1, wherein the generating the first velocity model to a second velocity model operation is based at least in part on water bottom profile or salt body geometry.

\* \* \* \* \*